July 13, 1926.  
C. A. ERICKSON  
1,592,522
NONSKIDDING CHAIN
Filed Nov. 17, 1925
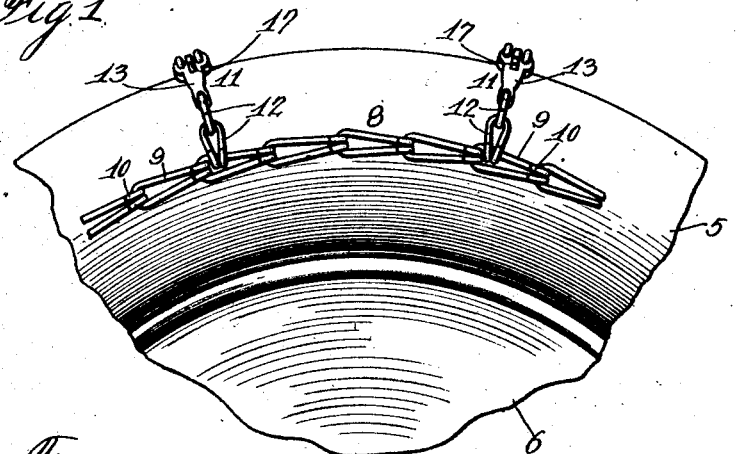
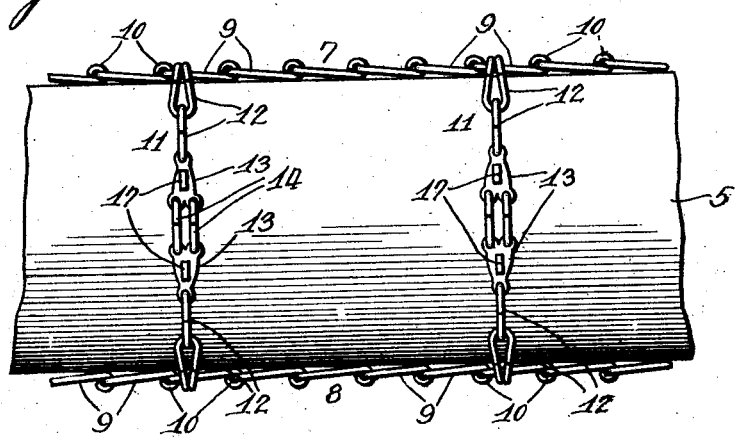
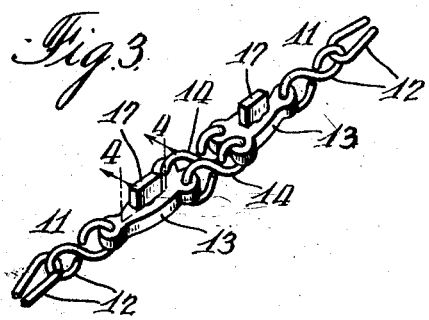
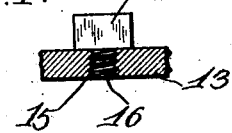
Inventor  
Carl A. Erickson  
By Chas. C. Tillson  
Atty Patented July 13, 1926.

1,592,522

UNITED STATES PATENT OFFICE.

CARL A. ERICKSON, OF CHICAGO, ILLINOIS.

NONSKIDDING CHAIN.

Application filed November 17, 1925. Serial No. 69,603.

This invention relates to improvements in non-skidding devices and has particular relation to improvement in chains to be applied to the wheels or tires of automobiles to prevent them from skidding and to make them take hold of the ground or pavement in a more effective manner than has heretofore been commonly attained.

The invention consists in certain peculiarities of the construction, novel arrangement and combination of the various parts thereof as will be hereinafter more fully set forth and specifically claimed.

In the accompanying drawing, which serves to illustrate an embodiment of the invention—

Fig. 1 is a view in side elevation of a portion of a vehicle or automobile wheel with a part of a non-skidding chain constructed according to my invention thereon.

Fig. 2 is a plan view thereof.

Fig. 3 is a detached perspective view of a portion of one of the cross chains of the device, and Fig. 4 is a view partly in section and partly in elevation taken on line 4—4 of Fig. 3 looking in the direction indicated by the arrows.

Like numerals of reference refer to corresponding parts throughout the different views of the drawing.

The reference numeral 5 designates a portion of the tire of an automobile wheel 6 which tire and wheel may be of the ordinary or any well known construction.

Mounted on the tire 5 is my improved non-skidding chain which comprises a pair of side chains 7, and 8, each of which side chains is composed of a series of links 9, which links are loosely connected together at their adjacent ends in any well known way, but by preference, by looping the ends 10, of one of the links over the adjacent end of the next link. As shown, these side chains 7, and 8, are placed longitudinally or rather circumferentially on the sides of the tire 5, about midway between its upper periphery and its lower periphery and may have their ends connected together, not shown, in any suitable way.

The device also comprises a plurality of cross chains, which are designated, as a whole by the reference numeral 11, and each cross chain comprises links 12, loosely united together and attached at their extremities to the side chains 7, and 8, in spaced relation. The inner end of one of the links 12, is loosely connected at its inner end to one end of a lug-like member 13, a pair of said members being employed in each of the cross chains 11 and said lug-like members 13, are united together loosely at the adjacent ends of each pair of members 13 by links 14 presenting their narrow faces upwardly and downwardly. Each of the lug-like members 13 is provided about midway of its length, with a screw-threaded opening 15 in which is fitted the screw-threaded shank 16 of a calk 17, which calk is, by preference, so located in its member 13 that its narrow side edge will be disposed longitudinally with respect to the side chain 11 in which it is located.

By reference to the drawing, it will be seen and understood that these calks 17 are located one on each side of the apex of the tire and that their broad sides or faces are disposed in the direction of the travel of the wheel.

By my improved construction of chains, it is apparent that the tires of the wheels will be prevented from skidding on wet pavements or ground and that they will serve to be pressed slightly into the pavement or ground as the wheels rotate by reason of the weight of the vehicle and its load. Furthermore, it is apparent that should these calks, or any of them become worn or broken, such calks can be readily removed and a new and perfect one placed in its stead.

Having thus fully described my invention what I claim as new and desire to secure by Letters Patent is—

A device of the class described comprising a cross chain having means at its ends to engage the side chains, said cross chain having a pair or lug-like members loosely connected together at their adjacent ends by a pair of links and provided with a vertical aperture, the members of each pair of said connecting links being spaced apart and presenting their narrow faces upwardly and downwardly above and below said lug-like members, a calk having a stem to detachably engage said aperture and adapted to rest on the outer surface of each of said solid members, the said calks being of an elongated rectangular shape in cross-section and having their broader sides or faces disposed in the direction of the travel of the wheel.

CARL A. ERICKSON.